A. A. KOHLER.
COMBINED RAKE AND HOE.
APPLICATION FILED MAY 22, 1909.
975,254.
Patented Nov. 8, 1910.
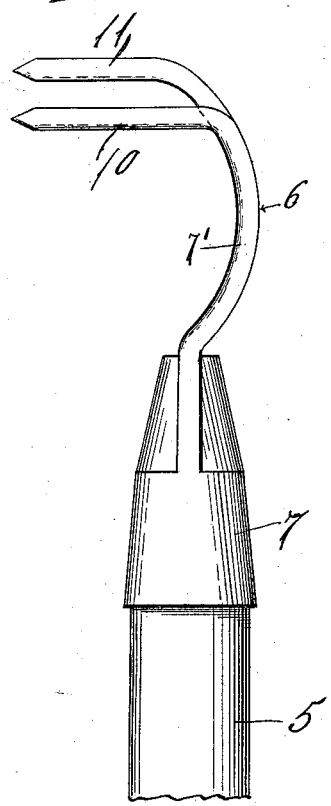
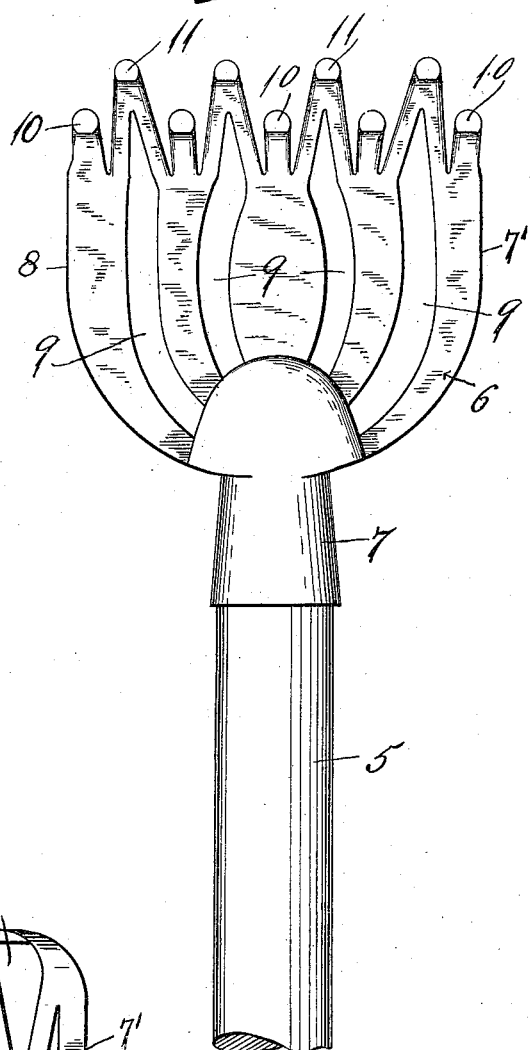
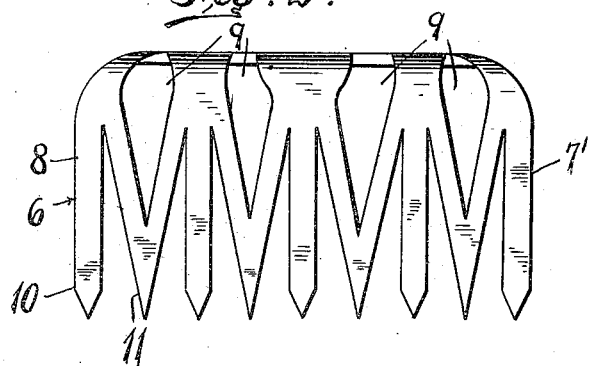
Witnesses
Jos. Gregory.
M. T. Miller.
Inventor
Alice A. Kohler.
By Chandler & Chandler
Attorneys

UNITED STATES PATENT OFFICE.

ALICE A. KOHLER, OF ASHLAND, OHIO.

COMBINED RAKE AND HOE.

975,254.  Specification of Letters Patent.  Patented Nov. 8, 1910.

Application filed May 22, 1909. Serial No. 497,585.

*To all whom it may concern:*

Be it known that I, ALICE A. KOHLER, a citizen of the United States, residing at Ashland, in the county of Ashland, State of Ohio, have invented certain new and useful Improvements in Combined Rakes and Hoes; and I do hereby declare the following to be a full, clear, and exact description of the invention, such as will enable others skilled in the art to which it appertains to make and use the same.

This invention relates to improvements in that class of agricultural implements known as combined rakes and hoes.

It has for its particular object the provision of a head provided with a row of straight and curved teeth so arranged that relatively small lumps of earth and pieces of stone can be removed from a bed or the like in an expeditious manner.

Another object is the provision of an implement which is exceedingly simple in structure, and convenient to handle.

With these and other objects in view as will more fully hereinafter appear, the present invention consists in certain novel details of construction and arrangement of parts, hereinafter fully described, illustrated in the accompanying drawings and more particularly pointed out in the appended claim. It being understood that various changes in the form, proportion, size and minor details of the device may be made without departing from the spirit or sacrificing any of the advantages of the invention.

In the accompanying drawings forming part of the specification:—Figure 1 is a side elevation of the device. Fig. 2 is a front elevation thereof. Fig. 3 is a bottom plan view.

Similar numerals of reference are employed to designate corresponding parts throughout.

In the drawings the numeral 5 designates the handle, and the head is designated in general by the numeral 6, and is provided at its rear end with a socket 7 to receive the handle. The head and teeth are preferably formed integral and the former is oblong and has its opposite longitudinal sides 7' and 8 extending outwardly from the inner end of the socket 7 on a curved line and formed in that portion of the head between the longitudinal sides 7' and 8 are a plurality of spaced recesses 9. By forming the recesses 9 the weight of the head is considerably reduced. The head is curved upwardly and downwardly from the inner end of the socket 7, as clearly shown in Fig. 1.

At the outer end or that end remote from the socket 7 the usual teeth are formed. By referring now to the drawings it will be seen that these teeth extend downwardly in the usual manner and are substantially perpendicular to the head 6. In the present construction two rows of teeth are shown designated by the numerals 10 and 11. The teeth are all of the same length, and their ends may be sharpened or left blunt as desired. By referring now to the drawings it will be seen that the outer teeth at the opposite sides of the head are perfectly straight, while the teeth 11, adjacent the outer teeth 10 are curved outwardly and downwardly, while the teeth on the inner side of these curved teeth are perfectly straight and in alinement with the outer teeth 10. This construction is carried out throughout so that the teeth are arranged alternately straight and curved. Owing to the teeth being all of the same length it is obvious that the ends of these teeth 11 will be disposed in a plane with the ends of the straight teeth 10. It will be further observed that the opposite sides of the curved teeth 11 diverge outwardly to their juncture with the sides of the straight teeth 10, whereby substantially "V" shaped crotches are formed which are adapted to carry off minute particles of stone, and sticks, and the like.

It is now clear that the teeth 10 are prong-like while the teeth 11 are V shaped and that the prong-like teeth alternate with the V shaped teeth. The object of this construction is that when the teeth are sunk into the earth to approximately half their length, the V shaped teeth will present a surface to the earth of about double the surface of the adjacent prong-like teeth so that a greater blade surface will be presented to the earth as the blade is sunk to half its depth into the earth. It will further be seen that the back of the blade is formed with a plurality of longitudinal slots which terminate in V shaped ends between the legs of the V shaped teeth and permit of the escape of earth through the back and blade, a structure which promotes the operation of the hoe and further provides a hoe of very light weight.

Thus it will be seen that I have provided a device which is exceedingly simple in structure and comparatively inexpensive to manufacture, embodying few parts and these so arranged that the danger of derangement will be reduced to a minimum. It will be further observed that with a device of this kind that the time usually employed to clear a flower bed and the like of debris will be reduced to a minimum.

Having thus described my invention what is claimed as new, is:—

A hoe having an arched back and a blade, said blade being formed with alternate prong-like and V shaped teeth arranged in separate parallel planes and having their free ends disposed in the same horizontal plane, said back being provided with a plurality of spaced longitudinal slots that extend into said blade and terminate in V shaped ends between the legs of said V shaped teeth to permit of the escape of earth through the back and blade.

In testimony whereof, I affix my signature, in presence of two witnesses.

ALICE A. KOHLER.

Witnesses:
G. M. KOHLER,
WILLIAM T. DEVOR.